United States Patent
Toyama et al.

(10) Patent No.: US 7,629,714 B2
(45) Date of Patent: Dec. 8, 2009

(54) ROCKING ACTUATOR AND LASER MACHINING APPARATUS

(75) Inventors: Souichi Toyama, Ebina (JP); Kounosuke Kitamura, Ebina (JP); Akira Doi, Hitachinaka (JP); Hiromu Hirai, Nagoya (JP); Kenta Seki, Nagoya (JP); Yoshiaki Kano, Nagoya (JP)

(73) Assignees: Hitachi Via Mechanics, Ltd., Ebina-shi (JP); National University Corporation Nagoya Institute of Technology, Nagoya-shi (JP)

( * ) Notice: Subject to any disclaimer, the term of this patent is extended or adjusted under 35 U.S.C. 154(b) by 98 days.

(21) Appl. No.: 11/833,695

(22) Filed: Aug. 3, 2007

(65) Prior Publication Data

US 2008/0036309 A1      Feb. 14, 2008

(30) Foreign Application Priority Data

Aug. 9, 2006   (JP)   ............................. 2006-216988

(51) Int. Cl.
  *H02K 33/00*    (2006.01)
(52) U.S. Cl. ............................. 310/36; 310/52; 310/54; 310/154.08; 310/156.84
(58) Field of Classification Search .................. 310/36, 310/52, 54, 154, 154.84, 154.36, 156, 156.08
  See application file for complete search history.

(56) References Cited

U.S. PATENT DOCUMENTS

| | | | | |
|---|---|---|---|---|
| 6,211,587 B1 * | 4/2001 | Enomoto et al. | ............... | 310/52 |
| 6,222,289 B1 * | 4/2001 | Adames | ........................ | 310/54 |
| 6,307,299 B1 * | 10/2001 | Suzuki et al. | ................ | 310/312 |
| 6,359,359 B1 * | 3/2002 | Miura et al. | ........... | 310/156.43 |
| 6,639,334 B2 * | 10/2003 | Chen et al. | ..................... | 310/52 |

(Continued)

FOREIGN PATENT DOCUMENTS

JP    2000-83351 A    3/2000

(Continued)

OTHER PUBLICATIONS

Magnet_Data.pdf (fact sheet from Integrated Magntics.com) (no date).*

(Continued)

*Primary Examiner*—Quyen Leung
*Assistant Examiner*—John K Kim
(74) *Attorney, Agent, or Firm*—Crowell & Moring LLP

(57) ABSTRACT

A rocking actuator and a laser machining apparatus which can suppress a temperature rise of a permanent magnet in a moving-magnet actuator. Even when a steerable mirror is positioned by rapid and continuous motions, highly reliable machining can be performed without degrading machining throughput or hole position accuracy. A cooling jacket for cooling a casing and heat transfer units brought into contact with a coil and the casing are provided. Heat generated in the coil is introduced to the casing through the heat transfer bypass units. Thus, the temperature rise of the coil is suppressed. Radial grooves are provided in the permanent magnet opposed to the coil so as to prevent an eddy current from appearing therein. Groove depth is made not smaller than skin depth expressed by a function of volume resistivity and permeability of the permanent magnet and a fundamental frequency of a current applied to the coil.

4 Claims, 5 Drawing Sheets

U.S. PATENT DOCUMENTS

| | | | |
|---|---|---|---|
| 6,661,145 B1 * | 12/2003 | Nilson | 310/156.22 |
| 2002/0047426 A1 * | 4/2002 | Pop, Sr. | 310/156.08 |
| 2002/0135245 A1 * | 9/2002 | Derleth et al. | 310/64 |
| 2003/0011262 A1 * | 1/2003 | Joho | 310/156.08 |
| 2006/0255665 A1 * | 11/2006 | Kraus et al. | 310/36 |

FOREIGN PATENT DOCUMENTS

| | | |
|---|---|---|
| JP | 2000-295804 A | 10/2000 |
| JP | 3199813 B2 | 6/2001 |
| JP | 2003-522968 A | 7/2003 |
| JP | 2003-245843 A | 9/2003 |
| JP | 2005-348462 A | 12/2005 |
| JP | 2005-354899 A | 12/2005 |
| WO | WO 01/33280 A2 | 5/2001 |

OTHER PUBLICATIONS

Hi-Dong Chai, "Electromechanical Motion Devices", Chap. 8, and copies of the Book Cover & contents Prentice-Hall, 1998, Upper Saddle River, N.J. 07458.

* cited by examiner

END PORTION — EFFECTIVE LENGTH — END PORTION

ROCKING ACTUATOR AND LASER MACHINING APPARATUS

FIELD OF THE INVENTION

The present invention relates to a rocking actuator using a coil as a stator and using a permanent magnet as a movable element fixed to a rotating shaft so as to rock the movable element within a predetermined range of angles, and a laser machining apparatus using such a rocking actuator.

BACKGROUND OF THE INVENTION

A laser machining apparatus for laser drilling a printed circuit board in a manufacturing process thereof needs a positioning control mechanism for irradiating a plurality of machining positions in a work piece with a laser beam sequentially. An optical scanner is often used to attain high machining throughput and high accuracy. The optical scanner is constituted by a rocking actuator and a servo controller. The rocking actuator includes a steerable mirror serving as a load element and fixed to a rotating shaft thereof. The servo controller controls the mirror so that the angle of the mirror can follow a command value.

The laser machining apparatus ordinarily serves as a numerical control (NC) system having a hierarchical control structure. The optical scanner belongs to the lowest class in the hierarchy. In a higher-class controller (hereinafter referred to as "supervisory controller"), based on CAM (Computer Aided Manufacturing) data of a printed circuit board, two-dimensional position coordinates of holes are described in an NC program in order of time when the holes should be machined. When machining is started, the supervisory controller transforms the hole position coordinates in the NC program sequentially, and transmits time-series angle command data to the optical scanner. To form a round hole in the printed circuit board, it is necessary to irradiate the printed circuit board with a laser beam after the steerable mirror has stood still at an angle commanded by the angle command data. Therefore, the transmission of the angle command data and the control of the irradiation with the laser beam are performed synchronously in the supervisory controller. The optical scanner operates to position the angle of the steerable mirror accurately correspondingly to the angle command data. Patent Document 1 discloses a technique for optimizing the laser drilling order in order to improve the throughput of a laser machining apparatus using the optical scanner.

Electromagnetic actuators are often used as rocking actuators. The electromagnetic actuators are categorized as moving-coil actuators or moving-magnet actuators. In a moving-coil actuator, a magnetic field is formed in an air gap between a permanent magnet of a stator and a yoke, and driving torque generated in the magnetic field by a moving coil according to Fleming's left hand rule is transmitted to a rotating shaft. In a moving-magnet actuator, which uses a coil as a stator and uses a permanent magnet as a movable element, driving torque generated by reaction of Fleming's left hand rule is received by the permanent magnet and transmitted to a rotating shaft. Patent Documents 2 and 3 disclose techniques about moving-magnet actuators. Patent Document 4 discloses a technique about a moving-coil actuator. In these actuators, rare-earth-based magnets such as neodymium iron boron magnets having a high residual flux density and a high coercive force are used as materials of permanent magnets in order to enhance the positioning responsiveness. Non-Patent Document 1 discloses a demagnetization curve, a temperature characteristic coefficient, etc. of a neodymium iron boron magnet.

Patent Document 5 discloses a technique about a motor having a rotor provided with a permanent magnet. In the motor, in order to reduce an eddy current loss which may be generated in the permanent magnet, the permanent magnet is axially or circumferentially split into a plurality, and insulators are provided among the split permanent magnets.

Patent Document 1: JP-A-2003-245843
Patent Document 2: Japanese Patent No. 3199813
Patent Document 3: JP-T-2003-522968
Patent Document 4: JP-A-2005-348462
Patent Document 5: JP-A-2005-354899
Non-Patent Document 1: Hi-Dong Chai, Electromechanical Motion Devices, Chap. 8, Prentice-Hall, 1998

The positioning responsiveness of the optical scanner, that is, the frequency of possible positioning motions per unit time is an essential factor in influencing the throughput of the laser machining apparatus. By use of the technique for optimizing the order of machining as disclosed in Patent Document 1, the frequency of short-stroke positioning motions can be increased. Thus, the throughput can be improved. In this case, the optical scanner performs the short-moving-distance positioning motions at a high speed. Accordingly, the optical scanner repeats the cycle of maximum acceleration, maximum deceleration and stop. Laser irradiation after the stop of the steerable mirror finishes in a short time. Accordingly, the time when the value of the coil current is 0 [A] is short, which causes a large copper loss. That is, Joule heat is generated by the current applied to the coil. When the heat is transmitted to the permanent magnet, the permanent magnet is demagnetized as described in Non-Patent Document 1. Particularly neodymium iron boron magnets have a large temperature coefficient of reversible demagnetization as compared with those of other magnet materials. The neodymium iron boron magnets fall 1.2 [%] in residual flux density and 6 [%] in coercive force every 10° C. of temperature rise. As a result, the gain of the feedback loop engaging in servo control declines so that the transient response such as an overshoot appears in the settling motion of the steerable mirror. Thus, the time required for positioning is prolonged.

An eddy current loss also causes a temperature rise of the permanent magnet. When the cycle of maximum acceleration, maximum deceleration and stop is repeated as described above, a current containing a high frequency component is applied to the coil. When the current is supplied in a pulse width modulation mode, frequency modulation components are contained in the current. The magnetic flux formed by the coil changes in accordance with these AC components. Accordingly, the eddy current appears in the permanent magnet opposed to the coil so that the temperature of the permanent magnet rises due to Joule heat generated by the eddy current. Cooling is therefore essential to obtain a high positioning responsiveness in the rocking actuator.

Patent Document 2 discloses a technique for transferring heat from a coil to a structure outside an actuator through a housing. Patent Document 3 discloses a technique for providing a heat sink and a cooling fan outside an actuator. A moving-magnet actuator has a yoke as a part constituting a stator. The yoke is provided outside a coil so that the yoke can transmit magnetic flux. Since the yoke is formed out of an iron-based material, the yoke is poor in heat conduction. However, Patent Documents 2 and 3 disclose no technique for solving the poor heat conduction of the yoke. Patent Document 4 discloses no technique for letting out the heat of the coil of the moving-magnet actuator.

Further, in the technique disclosed in Patent Document 5, the permanent magnet to be fixed to the rotor is split axially. Therefore, there is a fear that the torsional rigidity of the rotor may deteriorate. As described in BACKGROUND OF THE INVENTION, the angle of the movable element is servo-controlled in the rocking actuator. Accordingly, the servo control bandwidth is affected by a natural frequency of torsional vibration of the movable element. That is, when the torsional rigidity is low, the natural frequency also becomes low. Therefore in order to keep the feedback loop of the servo control stable, it is necessary to narrow the servo control bandwidth. When the servo control bandwidth is narrowed, there arises a problem that positioning responsiveness may be limited, or the positioning accuracy may deteriorate easily due to disturbance such as friction acting on the movable element.

SUMMARY OF THE INVENTION

An object of the present invention is to solve the foregoing problems of the background-art techniques.

Another object of the present invention is to provide a rocking actuator and a laser machining apparatus in which a temperature rise of a permanent magnet in a moving-magnet actuator can be suppressed, and, for example, even when a steerable mirror is positioned by rapid and continuous motions, highly reliable machining can be performed without degrading machining throughput or hole position accuracy.

In order to attain the foregoing objects, a first configuration of the present invention provides a rocking actuator including a movable element which includes a rotating shaft and a permanent magnet disposed around the rotating shaft, a stator which is disposed around the movable element and includes a coil and a yoke, and a housing which shelters the movable element and the stator, wherein the movable element is rocked within a predetermined range of angles. The rocking actuator is characterized in that a heat transfer bypass unit is provided, and the coil and the housing are thermally connected through the heat transfer bypass unit.

A second configuration of the present invention provides a rocking actuator including a movable element which includes a rotating shaft and a permanent magnet disposed around the rotating shaft, a stator which is disposed around the movable element and includes a coil and a yoke, and a housing which shelters the movable element and the stator, wherein the movable element is rocked within a predetermined range of angles. The rocking actuator is characterized in that a radial groove or radial grooves are formed in the permanent magnet so as to open toward the stator and have a depth not smaller than a skin depth expressed by a function of resistivity, permeability of the permanent magnet, and the fundamental frequency of a current applied to the coil.

A third configuration of the present invention provides a laser machining apparatus, which is characterized by including a rocking actuator according to the first or second configuration.

According to the first configuration, the temperature rise of the coil can be suppressed. As a result, the temperature rise of the permanent magnet can be suppressed. According to the second configuration, the eddy current loss which may occur in the permanent magnet can be reduced. In addition, decrease of the natural frequency of torsional vibration can be suppressed. As a result, a stable positioning responsiveness can be obtained in the rocking actuator.

DETAILED DESCRIPTION OF THE EMBODIMENT

An embodiment of the present invention will be described below with reference to the drawings.

Figure 1:
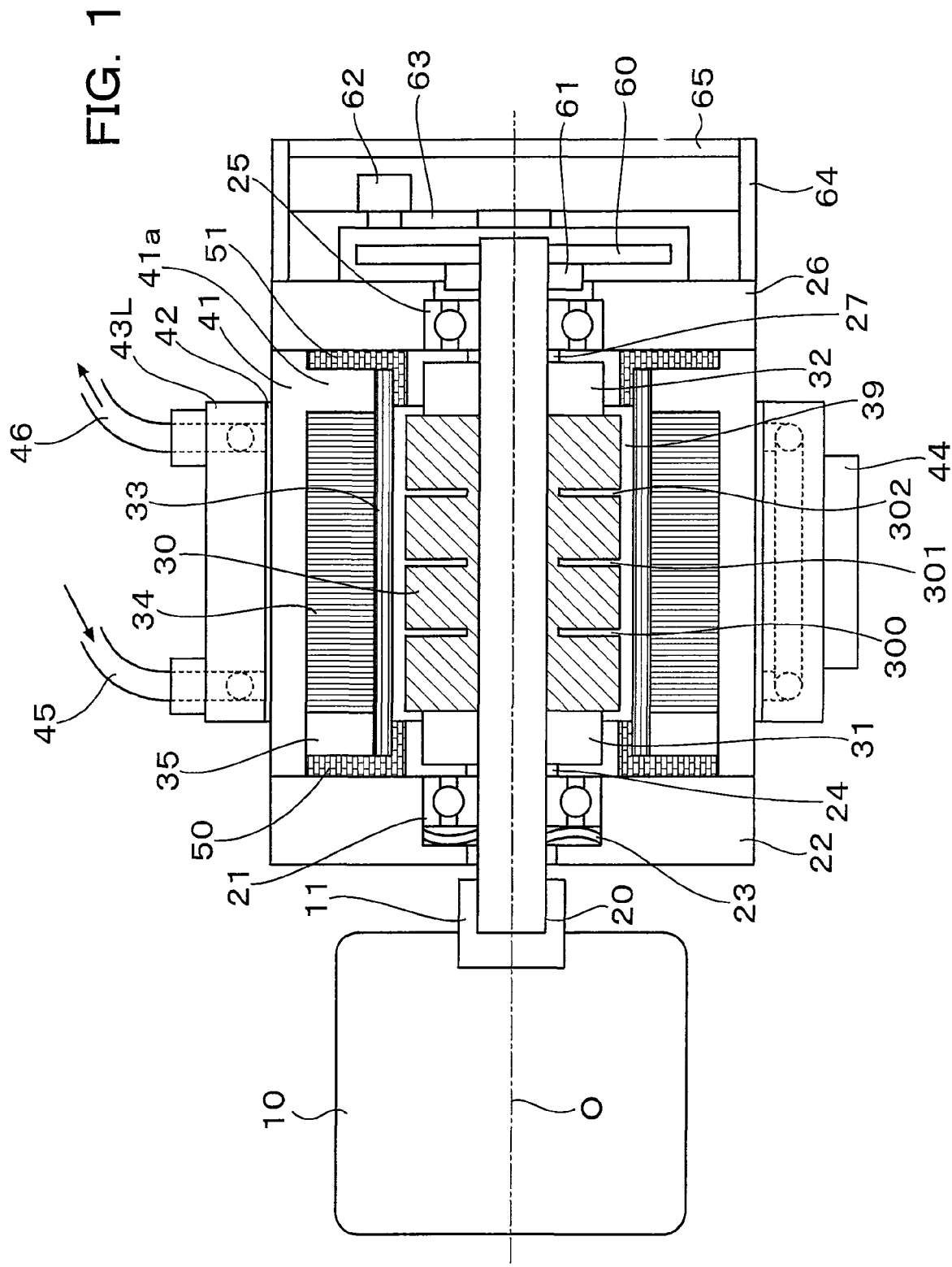
FIG. 1 is a front sectional view of a moving-magnet rocking actuator according to the present invention.
Figure 2:
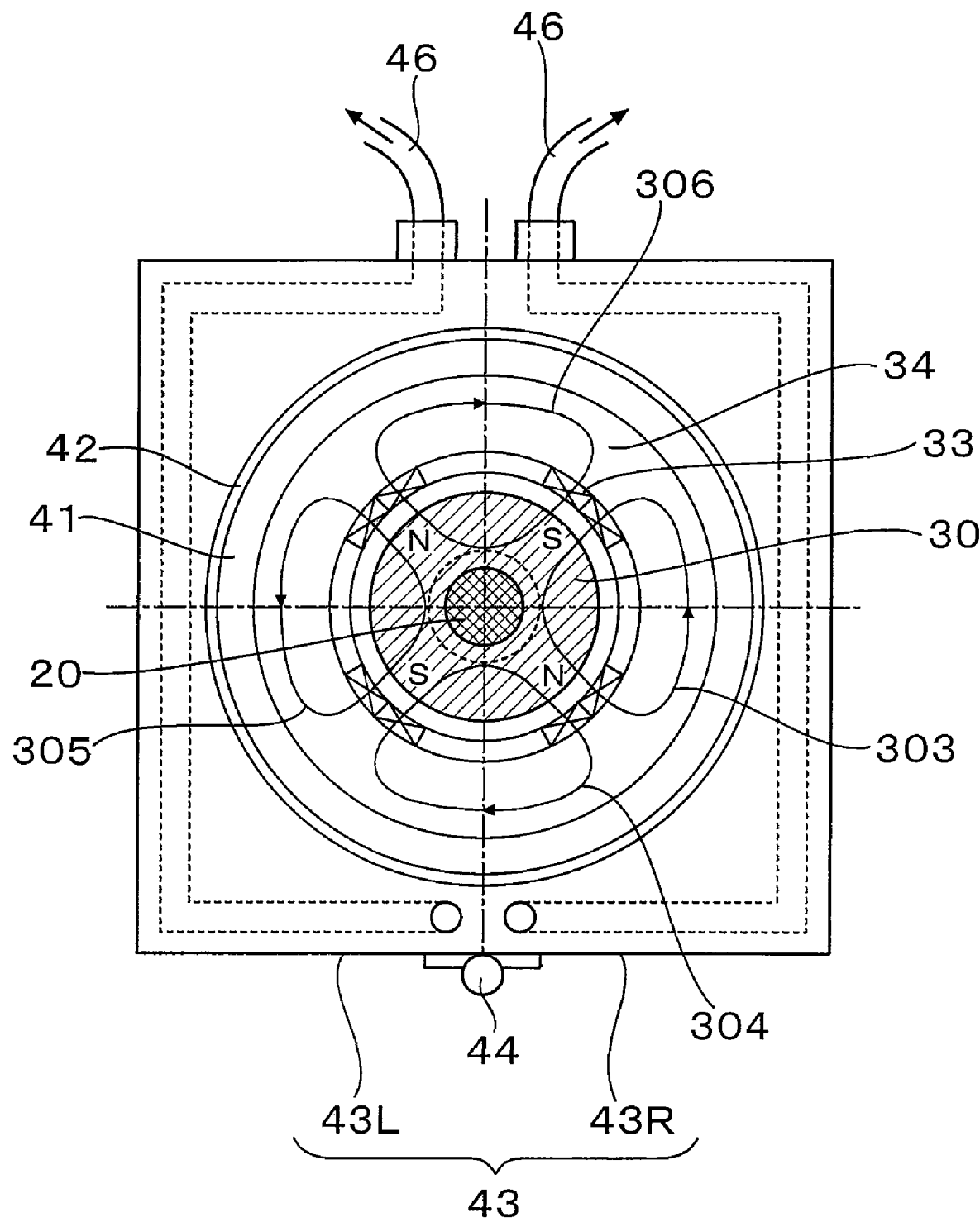
FIG. 2 is a sectional view of a magnetic circuit portion in FIG. 1.

FIG. 1 is a front sectional view of a moving-magnet rocking actuator according to the present invention, and FIG. 2 is a sectional view of a magnetic circuit portion in FIG. 1.

A steerable mirror 10 is fixed to one end portion of a rotating shaft 20 with a mirror mount 11. The rotating shaft 20 is supported by a ball bearing 21 and a ball bearing 25 so that smooth rocking motions can be performed.

The ball bearing 21 and the ball bearing 25 are retained in a bearing housing 22 and a bearing housing 26 respectively. A waved washer 23 urges an outer ring of the ball bearing 21 to the right in FIG. 1 so as to preload the ball bearing 21. The bearing housings 22 and 26 are formed out of a highly thermal conductive material (aluminum-based or copper-based).

A cylindrical permanent magnet 30 has an inner diameter which is a little (several μm) larger than the outer diameter of the rotating shaft 20. The permanent magnet 30 is fixed with an adhesive or the like to a position which is coaxial with the rotating shaft 20 and which is predetermined in an axial direction of the rotating shaft 20. The permanent magnet 30 has three circumferential grooves 300, 301 and 302. The grooves will be described in detail later.

An encoder plate 60 having a slit (not shown) in its surface is fixed to the other end portion of the rotating shaft 20 through a hub 61. A sensor head 62 is disposed in opposition to the slit of the encoder plate 60. The sensor head 62 is retained on a sensor base 63. The sensor base 63 is fixed to the bearing housing 26. The encoder plate 60 and the sensor head 62 form a rotary encoder for feedback control of the angular displacement of the steerable mirror 10.

A collar 24 and a collar 31 which are shoulders of the inner race of the ball bearing 21 are disposed between the ball bearing 21 and the permanent magnet 30. A collar 27 and a collar 32 which are shoulders of the inner race of the ball bearing 25 are disposed between the ball bearing 25 and the permanent magnet 30.

A coil 33 and a yoke 34 are disposed in opposition to the permanent magnet 30 through an air gap 39 and coaxially with an axis O of the rotating shaft 20. In order to suppress an eddy current, the yoke 34 is composed of iron-based laminated disks having high magnetic permeability and soft magnetism and laid in the direction of the axis O. The outer diameter of the yoke 34 is a little (several μm) smaller than the inner diameter of a casing 41 (housing). The yoke 34 is retained in the casing 41 so that one end portion (right end portion in FIG. 1) of the yoke 34 in the direction of the axis O is placed in contact with a flange 41a provided in an inner-diameter portion of the casing 41 while the other end portion is placed in contact with a yoke stop ring 35. The casing 41 is formed out of a highly thermal conductive material (aluminum-based or copper-based). The inner diameter of the flange 41a is larger than the outer diameter of the coil 33 formed in a part of a cylindrical shape which will be described later.

The outer diameter of the yoke stop ring 35 is a little (several μm) smaller than the inner diameter of the casing 41. The yoke stop ring 35 is formed out of a highly thermal conductive material (aluminum-based or copper-based). A heat transfer bypass unit 51 formed out of a highly thermal conductive material (copper in this embodiment) is disposed between the casing 41 and the bearing housing 26 while a heat transfer bypass unit 50 formed out of a highly thermal conductive material is disposed between the bearing housing 22 and the yoke stop ring 35. Each heat transfer bypass unit 50, 51 has a sectionally T-shaped cylindrical shape. The outer diameter of its large-diameter portion is a little (several μm) smaller than the inner diameter of the casing 41, and the outer diameter of its small-diameter portion is a little (several μm) smaller than the inner diameter of the coil 33.

The thickness of the large-diameter portion of the heat transfer bypass unit 50 is a little larger than the distance obtained from subtracting the thickness of the yoke 34 and the thickness of the yoke stop ring 35 from the distance from the left end of the casing 41 to the left end of the flange 41a. The thickness of the large-diameter portion of the heat transfer bypass unit 51 is a little larger than the distance from the right end of the casing 41 to the right end of the flange 41a. That is, the sum of the thicknesses of the heat transfer bypass unit 50, the yoke stop ring 35, the yoke 34, the flange 41a and the heat transfer bypass unit 51 in the direction of the axis O is larger than the length of the casing 41 in the direction of the axis O. Accordingly, when the bearing housing 22 and the bearing housing 26 are fixed to the casing 41 by not-shown bolts, the bearing housing 22, the heat transfer bypass unit 50, the yoke stop ring 35, the yoke 34, the flange 41a, the heat transfer bypass unit 51 and the bearing housing 26 come into tight contact in the direction of the axis O. In addition, the rotating shaft 20 is positioned in the direction of the axis O by the collar 24 and the collar 31 disposed between the bearing housing 22 and the permanent magnet 30 and the collar 32 and the collar 27 disposed between the bearing housing 26 and the permanent magnet 30.

Highly thermal conductive materials (for example, grease) are applied thinly between the outer circumference of the yoke 34 and the inner circumference of the casing 41, between the coil 33 and each heat transfer bypass unit 50, 51, between the large-diameter portion of each heat transfer bypass unit 50, 51 and the casing 41, between the heat transfer bypass unit 50 and the yoke stop ring 35, between the outer circumference of the yoke stop ring 35 and the inner circumference of the casing 41, between the yoke 34 and the yoke stop ring 35 and between the yoke 34 and the flange 41a so as to suppress thermal resistance in contact surfaces among the respective constituent parts. In addition, a sleeve 64 and a cover 65 are disposed in an end portion of the bearing housing 26 in order to protect the rotary encoder from dust.

A cooling jacket 43 formed out of a highly thermal conductive material (copper in this embodiment) is removably disposed on the outer circumference of the casing 41 with a thermal conductive sheet material 42. The cooling jacket 43 is constituted by a cooling jacket 43R, a cooling jacket 43L and a hinge 44. The cooling jackets 43R and 43L are symmetrical with respect to the diameter of the cooling jacket 43. When the cooling jackets 43R and 43L are closed on the hinge 44, the cooling jacket 43 comes into tight contact with the outer circumference of the casing 41 with the thermal conductive sheet material 42. A flow channel shown by the broken line is formed in the cooling jacket 43. Cooling water supplied from a not-shown cooling water supply unit is introduced into the cooling jacket 43 from a duct 45 connected to both the cooling jackets 43R and 43L. After the cooling water cools the cooling jacket 43, the cooling water is discharged through a duct 46 connected to both the cooling jackets 43R and 43L.

As shown in FIG. 2, the permanent magnet 30 is constituted by a combination of four magnet pieces each having a central angle of 90°. Each magnet piece has been magnetized radially. Magnetic fluxes 303, 304, 305 and 306 entering an air gap 39 from the N poles of the permanent magnet 30 cross the coil 33 and return to the S poles through the yoke 34 so as to draw closed loops.

Next, the coil 33 will be described.

Figure 3A:
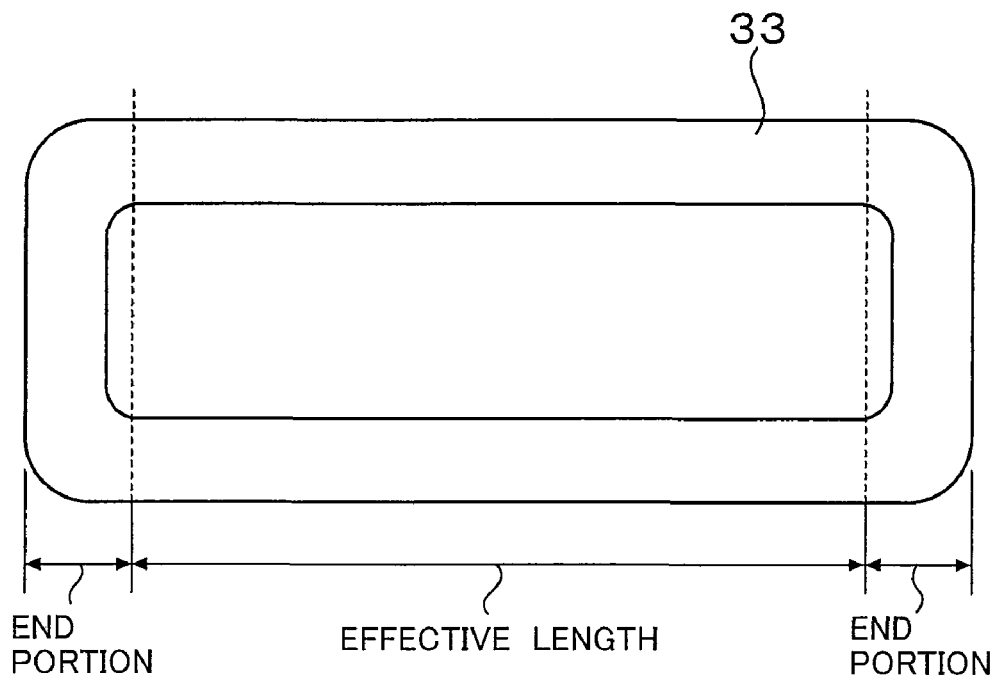
FIGS. 3A and 3B are views showing a shape of a coil element.
Figure 3B:
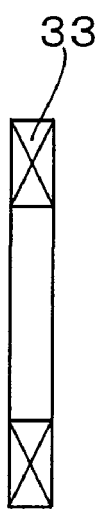

FIGS. 3A and 3B illustrate a shape of a coil element. FIG. 3A is a front view, and FIG. 3B is a side sectional view.

As shown in FIG. 3A, the coil element is a wire of copper or the like wound into a flat and rectangular frame-like shape. Four coil elements like this are curved into arcs so that they can be fitted to the inner diameter of the yoke 34. The four coil elements are connected electrically and placed so that the effective length of the coil 33 is parallel to the rotating shaft 20. The coils are bonded to the inner circumferential surface of the yoke 34 with a highly thermal conductive adhesive. Each magnetic flux 303, 304, 305, 306 and a current flowing into the effective length of the coil 33 cross each other at right angles. Accordingly, when a current is supplied to the coil 33, a tangential electromagnetic force acts on the permanent magnet 30. The rotating shaft 20 rotates due to the electromagnetic force. Thus, the steerable mirror 10 makes an angular displacement. Portions shown as end portions in FIG. 3A are portions which will come into contact with the heat transfer bypass units 50 and 51 respectively.

Next, the heat transfer path will be described.

Figure 4:
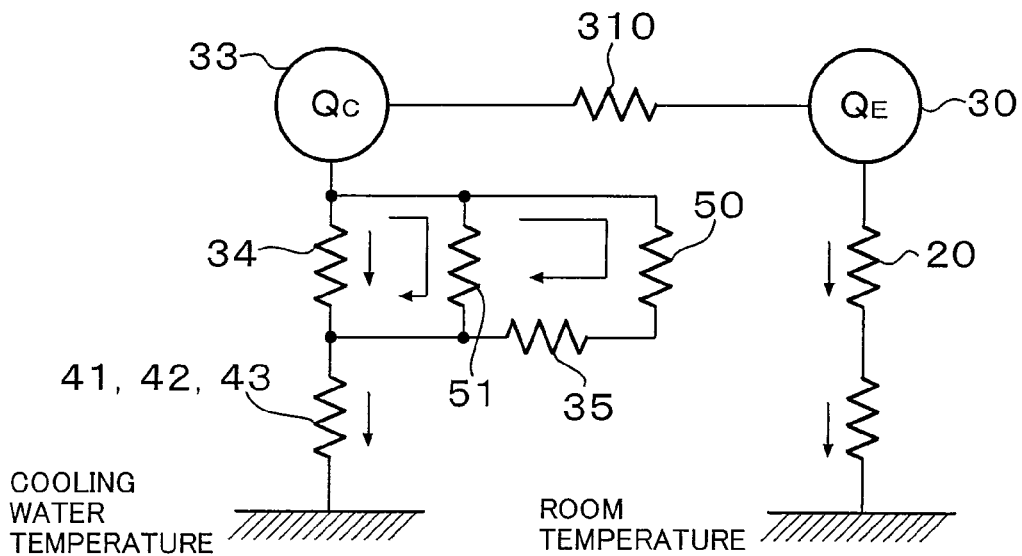
FIG. 4 is a schematic diagram showing a simplified heat transfer path of the rocking actuator according to the present invention.

FIG. 4 is a schematic diagram showing the simplified heat transfer path of the rocking actuator according to the present invention. As described in the above-mentioned BACKGROUND OF THE INVENTION, heat sources are a Joule heat (the reference sign $Q_C$ in FIG. 4) generated in the coil 33 and an eddy current loss (the reference sign $Q_E$ in FIG. 4) developed as heat in the permanent magnet 30.

The yoke 34 is composed of an iron-based material which is low in thermal conductivity. In the present invention, however, the coil 33 is connected to the heat transfer bypass unit 50, the yoke stop ring 35 and the heat transfer bypass unit 51 which are high in thermal conductivity. The heat transfer bypass unit 50, the yoke stop ring 35 and the heat transfer bypass unit 51 are in contact with the casing 41. Accordingly, the Joule heat $Q_C$ is transferred to the casing 41 rapidly, and removed to the outside of the actuator through the cooling water. That is, the path which can transfer the Joule heat of the coil 33 to the cooling means is composed of parallel branches, that is, a branch via the yoke 34 and a branch via the heat transfer bypass unit 51, the heat transfer bypass unit 50 and the yoke stop ring 35. Thus, the thermal resistance of the path becomes low. As a result, the temperature rise of the coil 33 is low. In this case, when the casing 41 is brought into contact with the bearing housing 22 and the bearing housing 26 in the direction of the axis O, the heat generated in the coil 33 flows to the casing 41 through the bearing housing 22 and the bearing housing 26. Thus, the temperature rise of the coil 33 can be made lower.

When the inner diameter of the flange 41a is made a little (several μm) larger than the outer diameter of the coil 33 and highly thermal conductive grease is applied between the both, the cooling efficiency can be more improved.

Next, the grooves 300, 301 and 302 provided in the permanent magnet 30 will be described.

The magnetic fluxes change inside the permanent magnet 30 due to an AC component of a current applied to the coil 33. Accordingly, an eddy current is generated in the permanent magnet 30 so that an eddy current loss $Q_E$ appears as heat. It is believed that the eddy current loss $Q_E$ appearing in the permanent magnet 30 escapes to the air around the rocking actuator through the rotating shaft 20. Thermal resistance 310 of the air gap 39 is so high that the heat of the eddy current loss $Q_E$ cannot be expected to be cooled very well by the cooling jacket 43. For the eddy current loss $Q_E$, it is therefore necessary to reduce the eddy current itself.

The eddy current appears in a so-called skin. When the grooves are made deeper than the skin, the eddy current can be disconnected so that the loss can be reduced.

Depth d of the skin can be calculated by a calculation expression of skin depth known in the electromagnetism, as shown in Expression 1. When δ designates the depth (distance) from the surface, the current density in the depth δ is attenuated to $e^{(-\delta/d)}$ with respect to that in the surface.

$$\text{skin depth } d=\sqrt{(2\rho/\omega\mu)} \qquad \text{(Expression 1)}$$

Here, ρ and μ are material constants of the permanent magnet, that is, ρ designates the resistivity and μ designates the magnetic permeability. On the other hand, e designates the base of the natural logarithm and ω designates the angular frequency of flux reversal.

More specific description will be made next.

Figure 5:
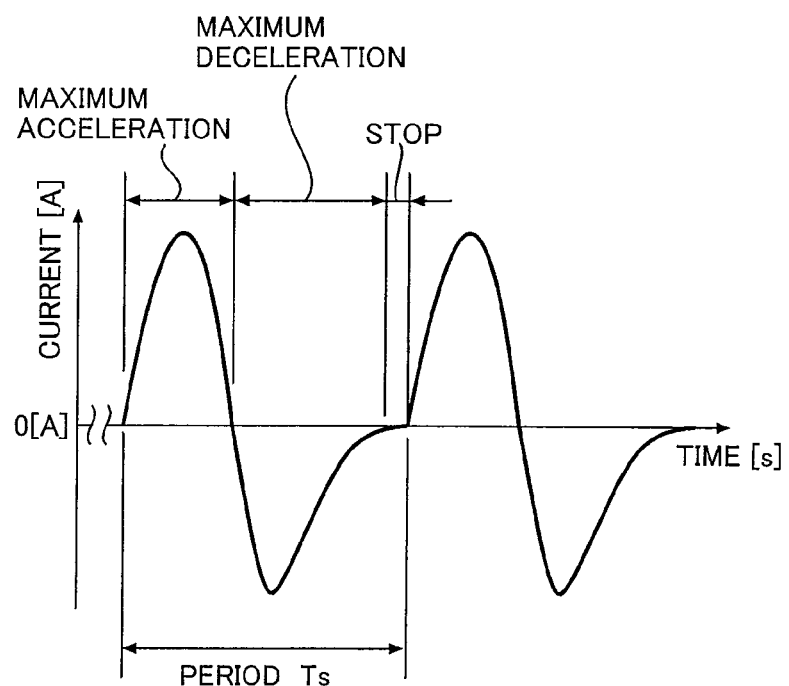
FIG. 5 is a schematic diagram of a waveform of a current to be applied to the coil.

FIG. 5 is a schematic diagram of a waveform of a current to be applied to the coil 33.

When short-stroke positioning motions in one and the same direction are performed continuously, one cycle of the current waveform consists of maximum acceleration, maximum deceleration and stop in this order. When the current waveform is Fourier-expanded, the angular frequency of flux reversal can be expressed as $\omega=2\pi/T_s$ [rad/s] since the fundamental frequency component is expressed as the reciprocal $1/T_s$ [Hz] of the period $T_s$. According to the aforementioned calculation expression, the lower the angular frequency ω is, the larger the skin depth d is. It is rational to design the depth of each groove in conformity to the fundamental frequency component of the current.

For example, when a neodymium iron boron magnet is used as the permanent magnet 30:

$\rho=1.5\times10^{-6}$ [Ωm]; and $\mu=1.4\times10^{-6}$ [H/m]

Therefore, when the permanent magnet 30 is a neodymium iron boron magnet and the positioning responsiveness is $1/T_s=2$ kHz, the skin depth d becomes 13 mm. In this case, the grooves 300-302 are designed to be as deep as or deeper than 13 mm. As for the width of each groove, it will go well if the width is 0.5 mm or smaller.

In this case, when grooves are provided intensively in a place where a plenty of an eddy current will flow easily, the eddy current can be reduced efficiently. That is, if the grooves 300, 301 and 302 were not provided in FIG. 1, the current density of the eddy current would be high in the vicinity of the axial center of the permanent magnet 30. It is therefore possible to reduce the eddy current efficiently when the grooves are provided intensively in the portion where the current density of the eddy current will be high.

The eddy current loss can be reduced as the number of grooves is increased. However, the torque constant is reduced in accordance with the width of each groove. In order to suppress the reduction of the torque constant, a magnet having a high electric resistance, such as a bonded magnet, may be charged into each groove.

When the thickness of the permanent magnet 30 is smaller than the skin depth d, it will go well if the reduction of the torsional rigidity of the permanent magnet 30 is suppressed not to affect the positioning of the steerable mirror (for example, the distance between the bottom of each groove and the rotating shaft 20 is set to be 10-30% of the thickness of the permanent magnet 30).

Figure 6A:
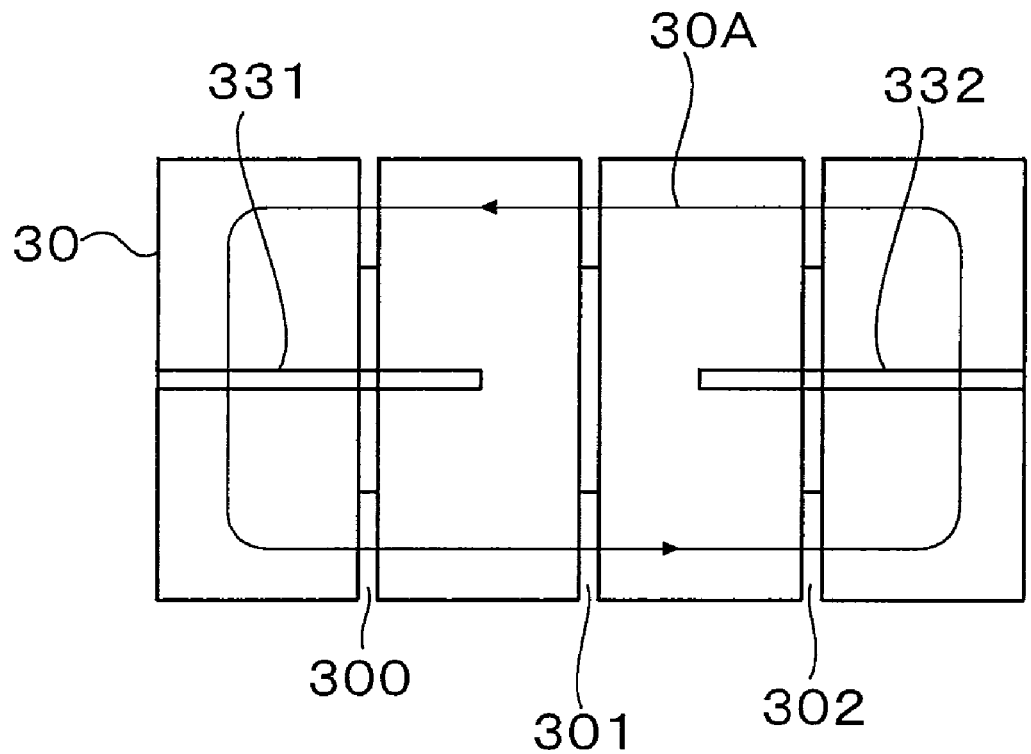
FIGS. 6A and 6B are views showing another embodiment of the present invention.
Figure 6B:
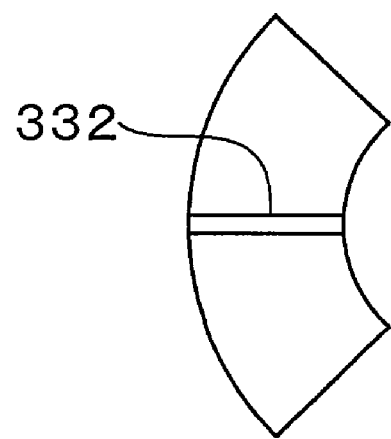

FIGS. 6A and 6B are views showing another example of grooves provided in the permanent magnet 30. FIG. 6A is a front view, and FIG. 6B is a side view.

In place of the circumferential grooves 300, 301 and 302, grooves 331 and 332 may be provided in the direction of the axis O so that the loop of an eddy current 30A can be disconnected. In this case, as shown in FIG. 6A, the groove 331 and so on may be provided together with the groove 301 and so on.

In this embodiment, the axial gaps among the respective constituent parts are set as very small distances. It is therefore possible to reduce the thermal resistance.

When the thermal conductivity of a member applied into the gaps is high, the axial gaps among the respective constituent parts may be increased to large values.

The outer diameter of the yoke 34 may be a little larger than the inner diameter of the casing 41. In this case, the yoke 34 is pressed into the casing 41.

A flow channel may be provided in the casing 41 so as to cool the casing 41 directly without externally connecting the cooling jacket 43 to the casing 41.

A medium to be supplied to the cooling jacket 43 is not limited to water, but gas may be used as the medium.

As described in the aforementioned BACKGROUND OF THE INVENTION, in a laser machining apparatus for laser drilling a printed circuit board in a manufacturing process thereof, a laser beam is positioned in a machining position by an optical scanner constituted by a rocking actuator including a steerable mirror serving as a load element and fixed to a rotating shaft thereof, and a servo controller for controlling the mirror so that the angle of the mirror can follow a command value. Accordingly, when a rocking actuator according to the present invention is used in such a laser machining apparatus, highly reliable machining can be performed without degrading machining throughput or hole position accuracy even if the steerable mirror is positioned by rapid and continuous motions.

The invention claimed is:

1. A rocking actuator comprising:
    a movable element which includes a rotating shaft and a permanent magnet disposed around the rotating shaft;
    a stator which is disposed around the movable element and includes a coil and a yoke; and
    a housing which shelters the movable element and the stator;
wherein:
    the movable element is rocked within a predetermined range of angles;
    the permanent magnet is a neodymium iron boron magnet; and
    a radial groove or radial grooves are formed in the permanent magnet so as to open toward the stator and have a depth not smaller than a skin depth of 13 mm, calculated from the resistivity and permeability of the permanent magnet, and a fundamental frequency of around 2 kHz of a current applied to the coil.

2. A rocking actuator according to claim 1, wherein:
two or more of the grooves are provided around the axial center of the rotating shaft.

3. A rocking actuator according to claim 1, wherein:
the depth of the groove or each of the grooves is made as large as a distance obtained by subtracting 10 to 30% from a radial thickness of the permanent magnet when the calculated groove depth is not smaller than the radial thickness of the permanent magnet.

4. A laser machining apparatus comprising:
a rocking actuator having a movable element which includes a rotating shaft and a permanent magnet disposed around the rotating shaft and which is arranged to be rocked within a predetermined range of angles;
a stator which is disposed around the movable element and includes a coil and a yoke;
a housing which shelters the movable element and the stator; and
a heat transfer bypass unit having high thermal conductivity;
the coil and the housing are thermally connected through the heat transfer bypass unit;
a cooling unit for cooling the housing; and
the depth of the groove or each of the grooves is made as large as a distance obtained by subtracting 10 to 30% from a radial thickness of the permanent magnet when the calculated groove depth is not smaller than the radial thickness of the permanent magnet.

* * * * *